US008351768B2

(12) United States Patent
Dalal et al.

(10) Patent No.: US 8,351,768 B2
(45) Date of Patent: Jan. 8, 2013

(54) MEDIA PROCESSING COMPARISON SYSTEM AND TECHNIQUES

(75) Inventors: Firoz Dalal, Bellevue, WA (US); Shyam Sadhwani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 12/507,875

(22) Filed: Jul. 23, 2009

(65) Prior Publication Data

US 2011/0018889 A1    Jan. 27, 2011

(51) Int. Cl.
*H04N 5/93* (2006.01)
*H04N 5/917* (2006.01)
(52) U.S. Cl. ........................................ 386/353; 386/355
(58) Field of Classification Search ........................ None
See application file for complete search history.

(56) References Cited

U.S. PATENT DOCUMENTS

| | | | |
|---|---|---|---|
| 7,023,471 B2 | 4/2006 | Balasubrawmanian et al. | |
| 7,259,779 B2 | 8/2007 | Avadanei et al. | |
| 7,391,434 B2 | 6/2008 | Yang | |
| 7,961,936 B2 * | 6/2011 | Liang et al. | 382/154 |
| 2004/0139173 A1 | 7/2004 | Karaoguz et al. | |
| 2005/0080673 A1 | 4/2005 | Picker et al. | |
| 2005/0131998 A1 * | 6/2005 | Takashima | 709/203 |
| 2007/0103551 A1 | 5/2007 | Kim et al. | |
| 2008/0162713 A1 | 7/2008 | Bowra et al. | |
| 2009/0016429 A1 | 1/2009 | Kokojima et al. | |
| 2009/0147139 A1 * | 6/2009 | Watanabe et al. | 348/564 |

OTHER PUBLICATIONS

"Comparison of Video Codecs", retrieved at <<http://en.wikipedia.org/wiki/Comparison_of_video_codecs>>, May 15, 2009, pp. 10.
"Windows RTP Quality Monitor", retrieved at <<http://sourceforge.net/projects/rtpmonitor/>>, May 17, 2004, p. 1.
"Optimizing Video Quality for Windows XP Media Center Edition", retrieved at <<http://download.microsoft.com/download/e/b/a/eba1050f-a31d-436b-9281-92cdfeae4b45/MCEVid.doc>>, Windows Platform Design Notes, Feb. 8, 2005, pp. 44.
"NFI Comparator", retrieved at <<http://sourceforge.net/projects/comparator/>>, Jul. 17, 2007, p. 1.
Winkler, Stefan, "Perceptual Video Quality", retrieved at <<http://ivrgwww.epfl.ch/research/past_topics/video_quality.html, Dec. 12, 2006, pp. 2.
"International Search Report", Mailed Date: Jan. 28, 2011, Application No. PCT/US2010/040769, Filed Date: Jul. 1, 2010, pp. 9.

* cited by examiner

*Primary Examiner* — William C Vaughn, Jr.
*Assistant Examiner* — Asher Khan
(74) *Attorney, Agent, or Firm* — Mayer & Williams, PC

(57) ABSTRACT

A media processing comparison system ("MPCS") and techniques facilitate concurrent, subjective quality comparisons between media presentations produced by different instances of media processing components performing the same functions (for example, instances of media processing components in the form of hardware, software, and/or firmware, such as parsers, codecs, decryptors, and/or demultiplexers, supplied by the same or different entities) in a particular media content player. The MPCS receives an ordered stream of encoded media samples from a media source, and decodes a particular encoded media sample using two or more different instances of media processing components. A single renderer renders and/or coordinates the synchronous presentation of decoded media samples from each instance of media processing component(s) as separate media presentations. The media presentations may be subjectively compared and/or selected for storage by a user in a sample-by-sample manner.

14 Claims, 4 Drawing Sheets

MEDIA PROCESSING COMPARISON SYSTEM AND TECHNIQUES

BACKGROUND

Media content players may be hardware, software, firmware, or combinations thereof that render sets of video, audio, graphics, images, and/or data content ("media content items") for presentation to users. Media content items that are rendered and presented to users may be referred to as "media presentations."

Media content players may be stand-alone consumer electronic devices, or included in other electronic devices. Although, any type of known or later developed electronic device may be or include a media content player, examples of electronic devices that have served user demand for consumption of media content items include but are not limited to: servers; optical media players; personal computers; personal media players; video recorders; portable communication devices such as phones and personal digital assistants; set-top boxes; and gaming devices.

It is common for various entities to supply different media processing components of a media content player (for example, parsers, encoder/decoder pairs ("codecs"), decryptors, demultiplexers, and combinations thereof), and it is desirable to evaluate the quality of the media presentations produced by the interoperation of such media processing components in particular environments.

SUMMARY

A media processing comparison system ("MPCS") and techniques that facilitate subjective quality comparisons between media presentations produced by different media processing components in a particular operating environment are described herein. In one exemplary implementation, the media processing components are hardware, software, firmware, or combinations thereof, operating in a multimedia pipeline associated with a media content player, such as a Windows® multimedia pipeline operating in personal computing device. It will be appreciated, however, that any known or later developed framework may be used to implement a multimedia processing pipeline, and that any known or later developed media content player operating environment is possible.

In operation, the MPCS receives a particular media content item from a particular media source. The particular media content item is generally arranged as an ordered stream of encoded media samples, such as video, audio, graphics, images, data, or combinations thereof, playable within a predetermined amount of time referred to as a "play duration." In the exemplary implementation, the particular media content item is a video clip. Upon decoding, a particular encoded media sample (for example, a particular video frame) is playable to a user at a particular presentation time within the play duration.

The MPCS decodes a particular encoded media sample using two or more different instances of media processing components that perform the same functions (such as instances of parsers, encoder/decoder pairs ("codecs"), decryptors, demultiplexers, or combinations thereof supplied by different entities). Each different instance of media processing component(s) produces a decoded media sample corresponding to a particular encoded media sample. In the exemplary implementation, a particular media content item (or a particular encoded media sample thereof) is replicated to form multiple identical streams of encoded media samples, and a particular stream is input to and decoded by a particular instance of media processing component(s). Also in the exemplary implementation, decoded media samples produced by a particular instance of media processing component(s) are stored in (for example, written to) a queue. Each instance of media processing component(s) may store decoded media samples in a separate queue, or fewer queues (for example, a single queue) may be used.

A single renderer renders decoded media samples received from each instance of media processing component(s), producing rendered media samples. In the exemplary implementation, decoded media samples produced by a particular instance of media processing component(s) are received for rendering from a particular queue. The decoded media samples may be pushed or pulled from the particular queue. Generally, to ensure synchronicity, rendering does not occur until at least one decoded media sample (playable at or about the same presentation time) is available from each instance of media processing component(s).

The renderer also coordinates the synchronous presentation, as separate media presentations, of the rendered media samples from each instance of media processing component(s). In the exemplary implementation, a presentation thread reads decoded media samples from the queue(s) after it is determined that the queue(s) contain at least one decoded media sample (playable at or about the same presentation time) from each instance of media processing component(s). Queue locks may be used to maintain consistency in the state of the queue(s) during read/write operations, and decoded media samples produced by a particular instance of media processing component(s) may be deleted after rendering and/or presentation has occurred.

The separate, synchronized media presentations are subjectively compared and/or selected for storage by a user in a sample-by-sample manner. In this manner, media presentation quality may be measured efficiently and in real-time, without time-consuming intermediate steps and storage, such as decoding and saving uncompressed decoded data into separate files and then serially comparing the uncompressed files.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

To enhance investment in, and user satisfaction with, media content players, it is desirable to provide high quality presentation of video, audio, and/or data content. Currently, when a user desires to subjectively evaluate video quality produced by different media content players or media processing components thereof, such evaluation is generally performed by capturing the output of the player and/or component under test, and serially comparing it to the output of a reference player and/or component. Many time-consuming steps (such as decoding and saving uncompressed decoded data into separate files) are often necessary, followed by a serial comparison of the uncompressed files, and human memory often results in incorrect quality assessments. Although some known media content players can concurrently render and/or present more than one media content item (for example, a main movie along with features such as a director's commentary, actor biographies, or advertising), such media content players do not generally allow deinterlacing of multiple input pins and/or real-time presentation quality comparison.

A media processing comparison system ("MPCS") and techniques are described herein, which enable media presentation quality to be evaluated without time-consuming intermediate steps and storage, such as decoding and saving uncompressed decoded data into separate files and then serially comparing the uncompressed files. The MPCS and techniques facilitate concurrent, subjective quality comparisons between media presentations produced by different instances of media processing components performing the same functions (for example, instances of media processing components supplied by different entities) in a particular media content player. In one exemplary implementation, the media processing components include but are not limited to instances of parsers, encoder/decoder pairs ("codecs"), decryptors, demultiplexers, or combinations thereof, in the form of hardware, software, firmware, or combinations thereof.

Figure 1:
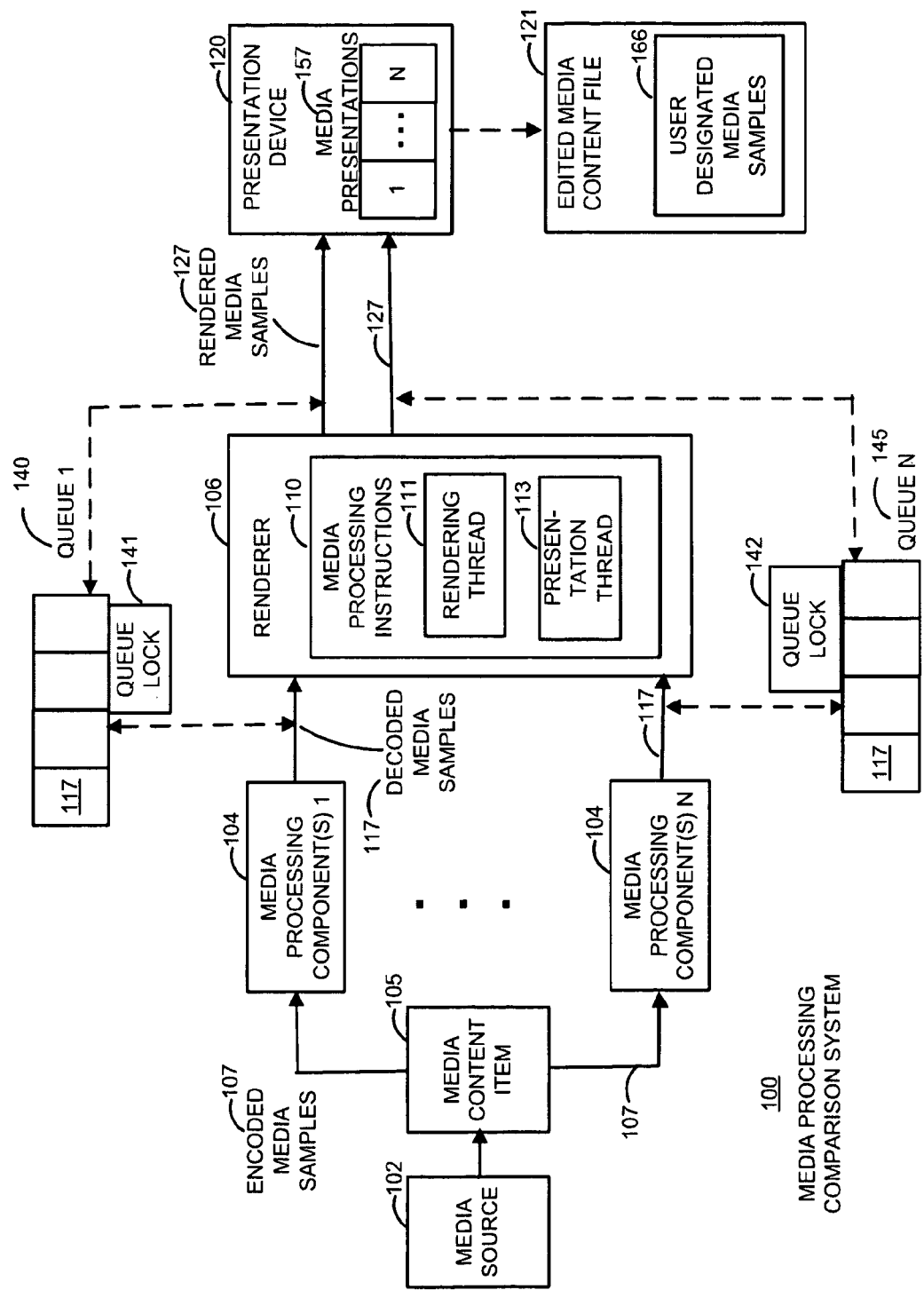
FIG. 1 is a simplified functional block diagram of a media processing comparison system.

Turning to the drawings, where like numerals designate like components, FIG. 1 is a simplified functional block diagram of an exemplary implementation of an MPCS 100. In general, design choices dictate how specific functions of MPCS 100 are implemented. Such functions may be implemented using hardware, software, firmware, or combinations thereof.

In the exemplary implementation, MPCS 100 is, or operates within, a multimedia pipeline associated with a media content player, such as a Windows® multimedia pipeline operating in personal computing device. It will be appreciated, however, that any known or later developed framework may be used to implement a multimedia processing pipeline, and that any known or later developed media content player operating environment is possible. Examples of media content players and operating environments therefor include but are not limited to: optical media players; operating systems for computing devices; personal media players; set-top boxes; servers; personal computers; video recorders; mobile phones; personal digital assistants; and gaming devices.

As shown in FIG. 1, MPCS receives a media content item 105 from a media source 102, performs processing tasks using two or more instances (instances 1 through N are shown) of media processing component(s) 104, and uses a renderer 106 to prepare the media content item for presentation to a user (not shown) as two or more synchronized media presentations 157 (media presentations 1 through N, corresponding to instances 1 through N of media processing component(s), are shown).

Figure 4:
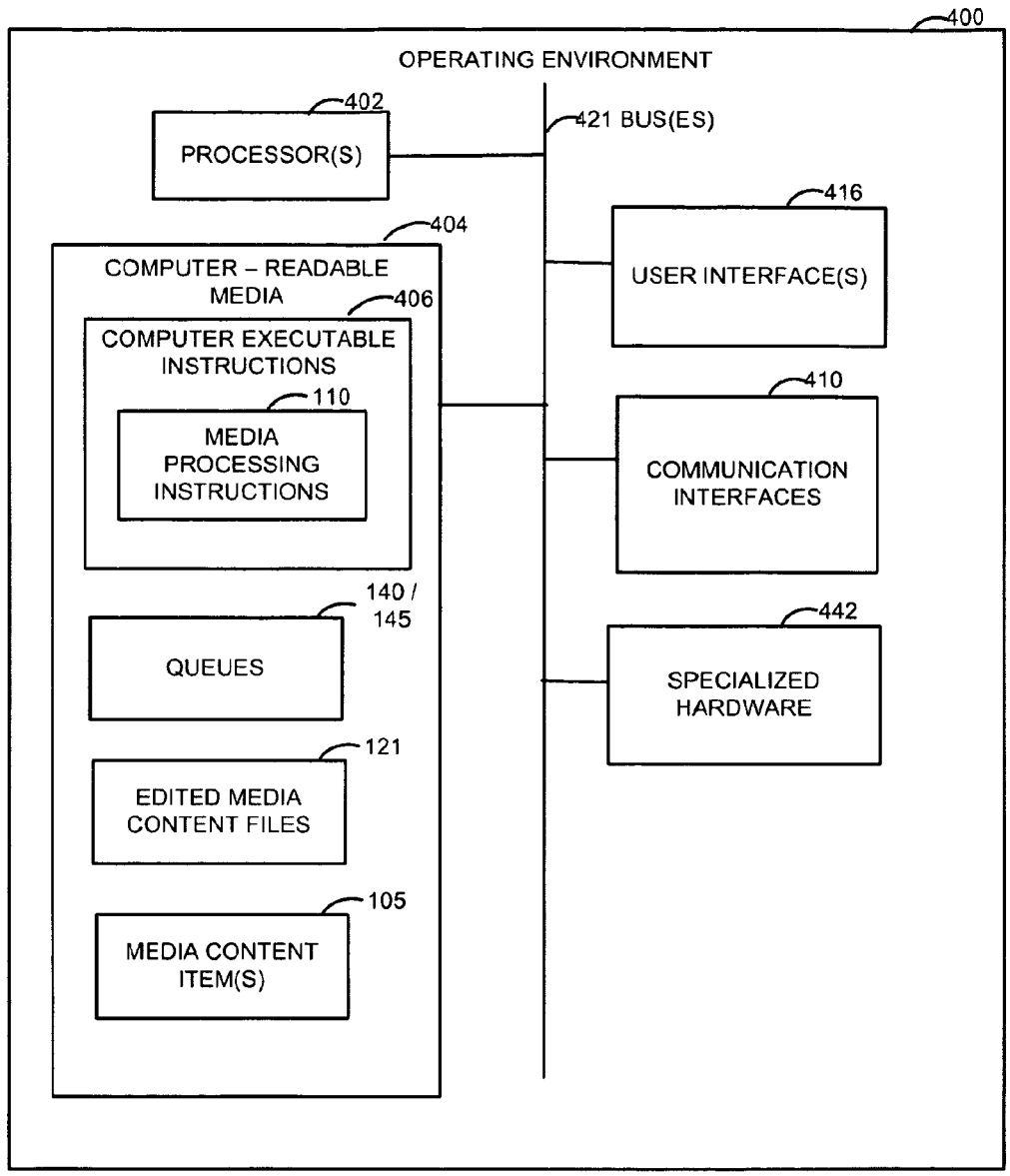
FIG. 4 is a simplified functional block diagram of an exemplary operating environment in which the media processing comparison system shown in FIG. 1 and/or the method shown in the flowchart of FIG. 3 may be implemented or used.

Media source 102 represents any device, location, or data from which media content item 105 is derived or obtained. Examples of media sources 102 include but are not limited to optical media, hard drives, network locations, over-the-air transmissions, and other sources. In general, any computer-readable medium may serve as media source 102 (computer-readable media 404 are shown and discussed further below, in connection with FIG. 4).

Media content item 105 represents an ordered set (for example, a stream) of digital information (such as video, audio, graphics, images, data, or combinations thereof) arranged into a number of individually-presentable units, referred to herein as "media samples." In an exemplary scenario, a particular media content item 105 is a video clip having sequentially ordered frames. As shown, prior to processing, the media samples are referred to as encoded media samples 107, after processing via instances of media processing component(s) 104 (discussed further below), the media samples are referred to as decoded media samples 117, after rendering via renderer 106 (discussed further below), the media samples are referred to as rendered media samples 127, and after presentation via presentation device 120 (also discussed further below) and user selection, the media samples are referred to as user-designated media samples 166. It will be appreciated, however, that the naming convention(s) used herein is/are for illustrative purposes only, and that any desired naming conventions may be used. It will also be appreciated that sequences of individually-presentable units and the digital information therein may be grouped in any desirable manner, and represented by any desired units, for example, bits, frames, data packets, groups of pictures, enhanced video object units, etc. It will further be appreciated that the digital information or amount thereof within a particular media sample may be based on several factors, such as the characteristics of the video, audio, graphics, images, or data that forms the media sample, or one or more parameters associated with media source 102 from which the media sample is derived (for example, media source identity and/or location, codec parameters or settings or encryption parameters or settings).

Figure 2:
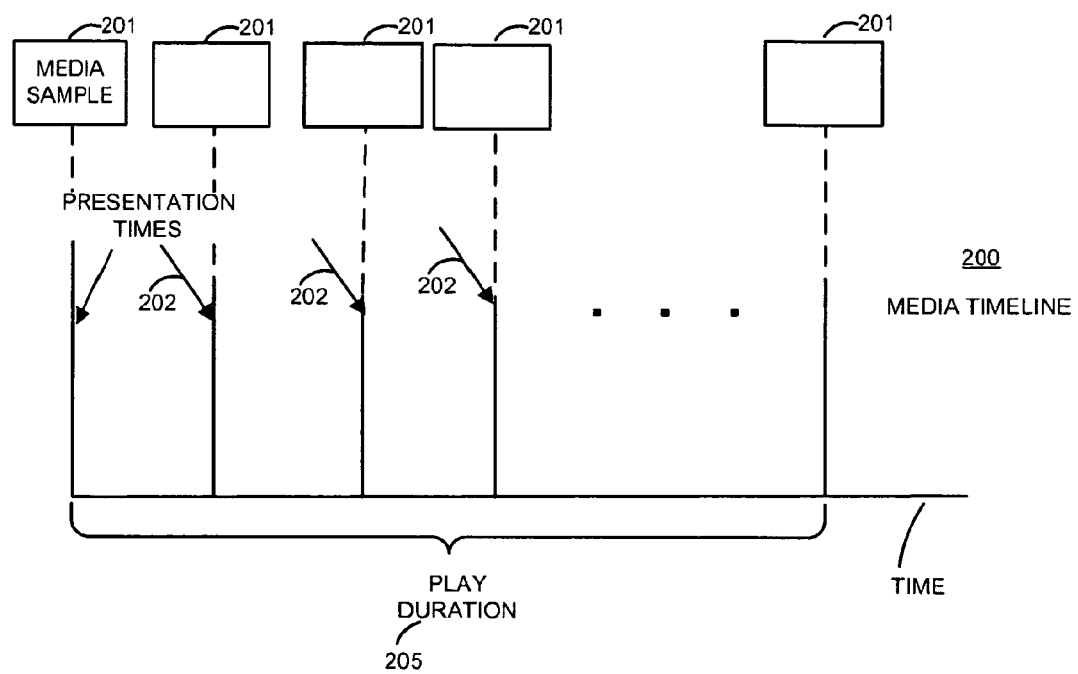
FIG. 2 is a graphical illustration of an exemplary media timeline associated with the exemplary media content item shown in FIG. 1.

With continuing reference to FIG. 1, brief reference is made to FIG. 2, which is a graphical illustration of an exemplary media timeline 200 associated with a particular media content item 105 having a number of individually-presentable units referred to as media samples 201. Media content item 105 has a predetermined play duration 205, which represents a particular amount of time in which the media content item is playable to a user. Each media sample 201 has an associated, predetermined presentation time 202 within the play duration. To avoid user-perceptible glitches in a media presentation, one or more upcoming media samples 201 may be prepared for presentation in advance of the scheduled/predetermined presentation time(s) 202.

Referring again to FIG. 1, media processing component(s) blocks 104 (1 through N are shown) represent any devices, instructions, or techniques used to retrieve video, audio, graphics, images, and/or data content from encoded media samples 107 received from media source 102, and to produce decoded media samples 117. Media processing component(s) perform functions that may include (but are not limited to) one or more of the following: parsing; encoding/decoding; decryption; demultiplexing; or a combination of the foregoing. Media processing component(s) may be, for example, parsers, codecs, decryptors, demultiplexers, or combinations thereof, that are implemented using hardware, software, firmware, or any combination thereof.

Generally, each instance of media processing component(s) 104 performs the same function(s) to produce a decoded media sample 117 corresponding to a particular encoded media sample 107 playable at a particular presentation time 202. Particular instances of media processing component(s) 104 may be different in various ways, including but not limited to: being supplied by different entities; operating in accordance with different standards; having different settings; or being implemented in different forms (for example, hardware, software, or firmware). In one exemplary implementation, media content item 105 or individual media samples thereof is/are replicated in such a manner that there are encoded media samples 107 concurrently available for input to each instance of media processing component(s) 104. It will be understood that when encoded media samples are input to an instance of media processing component(s), processing/decoding order and output order may be different.

Decoded media samples 117 produced by a particular instance of media processing component(s) 104 are stored in one or more queues (two queues are shown, queue 1140 and queue N 145). As shown, each instance of media processing component(s) 104 stores decoded media samples 117 in a separate queue, although fewer queues (for example, one queue) may be used. Decoded media samples 117 may be pushed onto the queues (by instances of media processing component(s), for example) or alternatively may be pulled onto the queues (by renderer 106, for example). Queue locks (queue locks 141 and 142 are shown) may be used to maintain consistency in the state of the queues during read/write operations.

Renderer 106 represents any device, instructions (for example, media rendering instructions 110, which as shown include rendering thread 111 and presentation thread 113), or technique used to: receive decoded media samples 117 from instances of media processing component(s) 104; prepare the decoded media samples for rendering; and produce rendered media samples 127. Rendered media samples 127 represent information that has been prepared for presentation at or about a particular presentation time 202 by renderer 106.

In the exemplary implementation, decoded media samples 117 produced by a particular instance of media processing component(s) are received for rendering from a particular queue via rendering thread 111. Renderer 106 may have multiple input pins. Queue locks 141 and 142 may be used to maintain consistency in the state of the queues during read/write operations. One manner of maintaining synchronicity is for rendering thread 111 to ensure that rendering of decoded media samples to produce rendered media samples 127 does not occur until at least one decoded media sample 117 (playable at or about the same presentation time 202) is available from each instance of media processing component(s) 104. Another manner of maintaining synchronicity is to ensure that media samples are not dropped, that is, to ensure that the number of decoded media samples received from each instance of media processing component(s) is the same. Thus, it is not generally necessary for rendering thread 111 to transmit quality messages to upstream media processing components.

Presentation thread 113 coordinates the synchronous presentation of rendered media samples 127 associated with each instance of media processing component(s) 104. Generally, rendered media samples 127 associated with different instances of media processing component(s) 104 are presented to a user as separate, synchronous media presentations 157 (media presentations 1 through N are shown) via one or more presentation devices 120 such as displays and/or speakers. A particular media presentation 157 represents the visible and/or audible information that is produced based on rendered media samples 127 by presentation device 120 and perceivable by the user.

A particular media presentation 157 is generally presented on a sample-by-sample basis, synchronized by presentation times 202 with the media presentations associated with other instances of media processing components(s). One manner of maintaining synchronicity is for presentation thread 113 to ensure that presentation of rendered media samples 127 does not occur until at least one rendered media sample (playable at the same presentation time 202) associated with each instance of media processing component(s) is available. In the exemplary implementation, this may be accomplished via an interaction of rendering thread 111 and queues 140, 145, as discussed above, or may be accomplished via an interaction of presentation thread 113 and queues 140, 145, or both. For example, state variables (not shown) may be used by presentation thread 113 to check if particular queues are empty or have decoded and/or rendered samples to be presented. Upon presentation, decoded and/or rendered media samples 127 may be removed from queues.

When media source 102 reaches the end of a particular media content item 105 (or when a user stops, pauses, or jumps to specific samples within, media presentation(s)), one or more events reach renderer 106. In the exemplary implementation, certain events indicate to rendering thread 111 that it should not expect to receive additional decoded media samples 117 from one or more instances of media processing component(s) 104, and rendering thread 111 may notify presentation thread 113. It is desirable for presentation thread 113 to wait to exit until it has received notice from rendering thread 111 that it should not expect to receive rendered media samples 127 associated with any of the instances of media processing component(s) 104.

Optionally, the user may designate desired media samples (referred to as "user-designated media samples 166") that are used form an edited media content file 121. For example, the user may compare media presentations 157 on a sample-by-sample basis and designate desired rendered media samples 127 for (or drop rendered media samples from) inclusion in edited media content file 121. Edited media content file 121 is generally an uncompressed file that may be stored in temporary or persistent memory.

In this manner, a user may efficiently and in real-time subjectively evaluate and compare media presentation quality, and thus evaluate performance of different media processing components, without extensive and time-consuming intermediate steps and storage.

Figure 3:
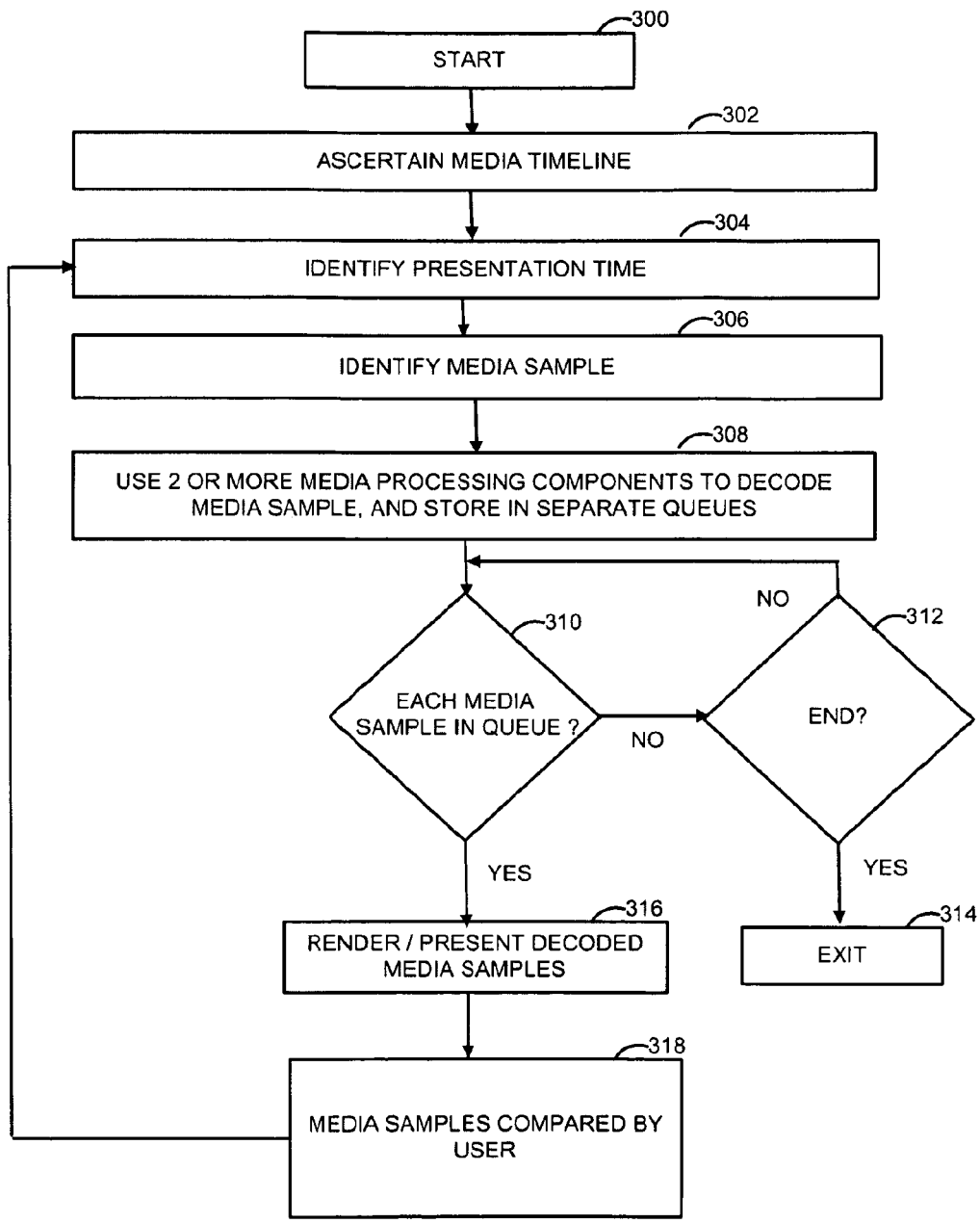
FIG. 3 is a flowchart of a method for rendering media content using aspects of the media processing comparison system shown in FIG. 1.

With continuing reference to FIGS. 1 and 2, FIG. 3 is a flowchart illustrating certain aspects of a method for rendering media content, such as media content item 105, using aspects of MPCS 100. The method(s) illustrated in FIG. 3 may be implemented using computer-executable instructions executed by one or more general, multi-purpose, or single-purpose processors (exemplary computer-executable instructions 406 and processor 402 are discussed further below, in connection with FIG. 4). It will be appreciated that the method of FIG. 3 is exemplary in nature, and that the subject matter defined in the claims is not necessarily limited to the specific features or acts described below. Rather, the specific features and acts described above are disclosed as example forms of implementing the claims. Unless specifically stated, the methods described herein are not constrained to a particular order or sequence. In addition, some of the described method or elements thereof can occur or be performed concurrently. It will be understood that all of the steps shown need not occur in performance of the functions described herein.

The method begins at block 300 and continues at block 302, where a media timeline associated with a particular media content item, such as media timeline 200, is ascertained. Based on the media timeline, as indicated at blocks 304 and 306, respectively, a presentation time, such as a particular presentation time 202, and a corresponding media sample, such as a particular encoded media sample 107, are identified. Next, the media sample is decoded using two or more instances of one or more media processing components that perform the same functions (such as parsers, codecs, decryptors, demultiplexers, or combinations thereof) to produce decoded media samples, such as decoded media samples 117, which are stored (in separate queues, for example).

At diamond 310, it is determined whether a decoded media sample associated with each instance of media processing component(s) is present (for example, whether a decoded media sample is present in each queue). If not, and it is not the end of the stream or playback has not otherwise ended as determined at block 312 (in which case the method exits, as indicated at block 314), then the method returns to diamond 310 until it is determined that a decoded media sample associated with each instance of media processing component(s) is present.

As indicated at block 316, the decoded media samples are rendered (to produce rendered media samples 127, for example) and synchronously presented (in a sample-by-sample manner as media presentations 157, for example). As discussed above in connection with FIG. 1, separate software or hardware threads, such as rendering thread 111 and presentation thread 113, may be used to ensure synchronization between media presentations associated with different instances of media processing component(s). Prior to presentation of rendered media samples, it may be desirable to wait until a rendered media sample associated with each instance of media processing component(s) is present—this may be accomplished using the same (or additional) queues as described in connection with block 308 and techniques as described in connection with diamond 310.

As indicated at block 318, a user may efficiently and in real-time subjectively evaluate and compare media presentation quality on a sample-by-sample basis, and thus evaluate performance of different media processing components, without extensive and time-consuming intermediate steps and storage.

With continuing reference to FIGS. 1 through 3, FIG. 4 is a simplified block diagram of an exemplary operating environment 400 in which aspects of MPCS 100 and/or the method(s) shown in FIG. 3 may be implemented or used. Operating environment 400 is generally indicative of a wide variety of general-purpose or special-purpose computing environments, and is not intended to suggest any limitation as to the scope of use or functionality of the system(s) and methods described herein. For example, operating environment 400 may be an electronic device such as a mobile phone, a server, a gaming device, a personal digital assistant, a mobile phone, a personal computer, a personal media player, a computer/television device, a set-top box, a hard-drive storage device, a video recorder, an optical media player, a device temporarily or permanently mounted in transportation equipment such as a wheeled vehicle, a plane, or a train, or another type of known or later developed electronic device.

As shown, operating environment 400 includes processor(s) 402, computer-readable media 404, computer-executable instructions 406, user interface(s) 416, communication interface(s) 410, and specialized hardware/firmware 442. One or more buses 421 or other communication media may be used to carry data, addresses, control signals, and other information within, to, or from operating environment 400 or elements thereof.

Processor 402, which may be a real or a virtual processor, controls functions of the operating environment by executing computer-executable instructions 406. The processor may execute instructions at the assembly, compiled, or machine-level to perform a particular process.

Computer-readable media 404 may represent any number and combination of local or remote devices, in any form, now known or later developed, capable of recording, storing, or transmitting computer-readable data. In particular, computer-readable media 404 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 406 represent any signal processing methods or stored instructions. Generally, computer-executable instructions 4306 are implemented as software components according to well-known practices for component-based software development, and encoded in computer-readable media. Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

User interface(s) 416 represents the combination of physical or logical presentation tools and controls that define the way a user interacts with a particular application or device, such as MPCS 100. Presentation tools are used to provide output to a user. An example of a physical presentation tool is presentation device 120 (such as a display or speaker). Another example of a physical presentation tool is printed material on a surface such as paper, glass, metal, etc. An example of a logical presentation tool is a data organization technique (for example, a window, a menu, or a layout thereof). Controls facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function to provide outputs to, and receive inputs from, a user.

Communication interface(s) 410 represent one or more physical or logical elements, such as connectivity devices or computer-executable instructions, which enable communication between operating environment 400 and external devices or services, via one or more protocols or techniques. Such communication may be, but is not necessarily, client-server type communication or peer-to-peer communication. Information received at a given network interface may traverse one or more layers of a communication protocol stack.

Specialized hardware 442 represents any hardware or firmware that implements functions of operating environment 400. Examples of specialized hardware include media processing components 104 or aspects thereof, application-specific integrated circuits, clocks, and the like.

It will be appreciated that particular configurations of operating environment 400 may include fewer, more, or different components or functions than those described. In addition, functional components of operating environment 400 may be implemented by one or more devices, which are co-located or remotely located, in a variety of ways.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method for rendering media content, the media content having a play duration and being arranged into a plurality of consecutive encoded media samples receivable from a media source, the method comprising:
    ascertaining at least a portion of a media timeline having a plurality of presentation times, presentation times representing times within the play duration at which particular encoded media samples, when decoded, are available to be presented to a user;
    identifying a particular presentation time;
    using a first media processing component, decoding one or more encoded media samples to produce a first decoded output media sample;
    using a second media processing component, decoding one or more encoded media samples to produce a second decoded output media sample;
    using a renderer, rendering the first decoded output media sample to produce a first rendered media sample;
    using the renderer, rendering the second decoded output media sample to produce a second rendered media sample; and
    at the particular presentation time, synchronously presenting the first and second rendered media samples to a user,
    wherein the first and second rendered media samples subjectively comparable by the user, and
    further comprising:
    storing the first decoded output media sample in a first queue;
    storing the second decoded output media sample in a second queue;
    at a time prior to the particular presentation time, determining whether both the first decoded output media sample is stored in the first queue and the second decoded output media sample is stored in the second queue;
    when both the first decoded output media sample is stored in the first queue and the second decoded output media sample is stored in the second queue, rendering the first and second decoded output media samples; and
    when either the first decoded output media sample is not stored in the first queue or the second decoded output media sample is not stored in the second queue, not rendering the first and second decoded media samples.

2. The method according to claim 1, further comprising:
    identifying a next consecutive presentation time;
    designating the next consecutive presentation time as the particular presentation time;
    repeatedly performing the steps of using the first media processing component, decoding one or more encoded media samples to produce a first decoded output media sample;
        using the second media processing component, decoding one or more encoded media samples to produce a second decoded output media sample;
        rendering the first decoded output media sample to produce a first rendered media sample;
        rendering the second decoded output media sample to produce a second rendered media sample; and
        at the particular presentation time, synchronously presenting the first and second rendered media samples to a user, the first and second rendered media samples subjectively comparable by the user.

3. The method according to claim 1, wherein rendering the first and second decoded output media samples comprises pulling the first and second decoded output media samples from the first and second queues, respectively.

4. The method according to claim 3, wherein pulling the first and second decoded output media samples from the first and second queues, respectively, comprises
    placing a lock on the respective queue,
    after placing the lock, pulling the respective decoded output media sample from the respective queue, and
    after pulling the respective decoded output media sample, releasing the lock on the respective queue.

5. The method according to claim 1, wherein storing the first and second decoded output media samples in the first and second queues, respectively, comprises
    placing a lock on the respective queue,
    after placing the lock, pushing the respective decoded output media sample onto the respective queue, and
    after pushing the respective decoded output media sample, releasing the lock on the respective queue.

6. The method according to claim 1, further comprising:
    after rendering and synchronously presenting, deleting the first and second decoded output media samples from the first and second queues, respectively.

7. The method according to claim 1, wherein the consecutive encoded media samples comprise video frames, and wherein the first and second rendered media samples are displayed and able to be compared by the user.

8. The method according to claim 1, wherein the consecutive encoded media samples comprise audio samples, and wherein the first and second rendered media samples are presented and able to be audibly compared by the user.

9. The method according to claim 1, further comprising:
replicating the media content to form a first media content stream and a second media content stream, the first media content stream comprising a media content stream under test and the second media content stream comprising a reference media content stream;
identifying one or more encoded media samples from the first media sample stream and one or more encoded media samples from the second media sample stream;
inputting the one or more encoded media samples from the first media sample stream to the first media processing component, the first decoded output media sample produced by the first media processing component; and
inputting one or more encoded media samples from the second media sample stream to the second media processing component, the second decoded output media sample produced by the second media processing component,
at the particular presentation time, synchronously presenting the first and second rendered media samples to a user comprising synchronously presenting the media content stream under test and the reference media content stream to the user,
the media content stream under test and the reference media content stream subjectively comparable by the user.

10. The method according to claim 1, wherein the first decoded output media sample is input to a first pin of the renderer, and the second decoded output media sample input to a second pin of the renderer.

11. The method according to claim 1, further comprising:
based on a user comparing the first and second rendered media samples, receiving a user designation of either the first rendered media sample or the second rendered media sample as being a higher quality rendered media sample;
adding the designated higher quality rendered media sample to an edited media content file, the edited media content file sharing the same media timeline as the media content, the designated higher quality rendered media sample playable at the particular presentation time.

12. The method according to claim 1, wherein the first and second media processing components are selected from the group comprising: parsers; codecs; decryptors; demultiplexers; and combinations thereof.

13. The method according to claim 1, wherein the first and second media processing components comprise codecs.

14. The method according to claim 1, wherein synchronously presenting comprises displaying the first and second rendered media samples via a single output window having separate partitions for the first and second rendered media samples.

* * * * *